March 3, 1936.   A. J. HANLEY ET AL   2,033,099
MATERIAL FOR USE AS LEATHER SUBSTITUTE AND METHOD OF MAKING SAME
Filed July 29, 1933
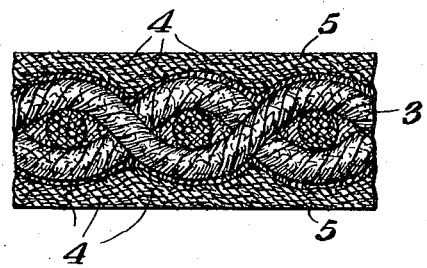
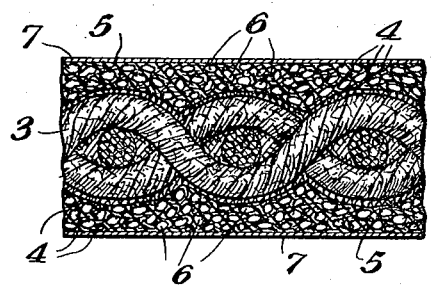
ALBERT J. HANLEY
ROLAND B. RESPESS
INVENTORS
BY
ATTORNEY Patented Mar. 3, 1936

2,033,099

UNITED STATES PATENT OFFICE 2,033,099

MATERIAL FOR USE AS LEATHER SUBSTITUTE AND METHOD OF MAKING SAME

Albert J. Hanley, Cranston, and Roland B. Respess, Wickford, R. I., assignors to Respro Inc., Cranston, R. I., a corporation of Rhode Island Application July 29, 1933, Serial No. 682,792

2 Claims. (Cl. 91—68)

This invention relates to materials for use as leather substitutes and the like, and to methods of manufacturing the same.

The objects of the invention are to provide a strong, durable, non-raveling, pliable, plastic, soft, resilient, porous and cushiony material, suitable for use as a leather substitute and the like, and to accomplish manufacture of the same - by economical practical methods.

The desired objects are attained by the novel features of invention hereinafter disclosed and broadly claimed.

The drawing accompanying and forming part of the specification illustrates certain practical features of the invention, it being understood that the actual physical structure may be modified and changed as regards this particular disclosure, all within the true intent and broad scope of the invention.

Fig. 1 is a broken sectional view illustrating the impregnated and coated structure prior to the step of blowing to create the porous surface layers filled with numerous gas cells.

Fig. 2 is a similar view illustrating the structure expanded by blowing and with surface coatings applied.

The base of the structure is a woven fabric of cotton or other suitable textile materials, or an unwoven fibrous material, such as cotton wadding.

This fibrous base is saturated with an adhesive, filmed with a layer or layers of rubber compound containing a blowing agent, and if desired, loaded with short length fibers of cotton or the like, and which after blowing and curing, exhibits the desired characteristics above mentioned.

In the illustration, a woven base fabric is indicated at 3, and this is preferably of a sheeting weave because of the cheapness and relative smoothness of its surfaces.

For convenience of handling, the base fabric may be wound firmly on cores in rolls of 50 yards or over.

The adhesive may be a vulcanizable rubber compound and saturation may be effected by passing the fabric while under tension through a bath of the rubber solution and removing the surplus by passing the rubber laden fabric through squeeze rolls or in contact with scrapers.

A variation of this method is to mount the roll of fabric or wadding on a doubling machine having two pressure rolls traveling at the same speed and which pull the fabric therethrough as it is released under a proper degree of tension. Before reaching these rolls, the fabric is wetted on one or both sides with an excess of adhesive and the pressure rolls act to express the adhesive into the fabric and to push back the surplus adhesive.

The rubber saturated fabric is then acted on by a drier suitable for removal of the solvent used in the rubber solution, which solvent, if desired, may be saved and re-used.

After leaving the drying chamber, the impregnated base may be calendered or pressed smooth and flat.

A special rubber compound is next applied. This substance, which may be applied to one or both faces of the saturated fabric, is compounded so as to be capable of being "blown" when heated, containing substances, such for example, as ammonium carbonate or a mixture of stearic acid and sodium bicarbonate, which when heated above 100° F. release gases, forming bubbles, gas pockets or voids within the rubber layer and which are held entrapped by the body of rubber. Other known methods of producing a porous condition within rubber may be utilized within the spirit of the invention and terms here used, such as "blown" and "blowing" are intended to apply thereto.

Preferably, the "blowing" compound is loaded with short length fibers, such as cotton or wood, or a-cellulose. These short fibers break up and entrap the bubbles of gas released during blowing, keeping them to smaller and more nearly uniform size and preventing the assembly of smaller into larger size bubbles. These fibers further serve to strengthen and reinforce the cellular porous rubber film or films on the saturated base structure and by interlacing with the impregnated base, act to unify and secure the surface layer or layers to the central base structure.

The short length loading fibers are indicated at 4, carried by the surface layers 5, of rubber compound. These fibers are distributed more or less uniformly in the compound before it is blown as indicated in Fig. 1, so that when blowing is effected, as has taken place in Fig. 2, they strengthen and reinforce the structure more or less uniformly throughout.

Other effects of loading the blowing compound with fibers are to increase the wearing qualities of the surface films and offer resistance to wear by friction, flexing and fatigue.

The rubber compound layer or layers may be applied to the saturated base fabric as a single coating from a rubber calendering operation or, may be built up as a series of knife coatings of a naphtha solution of the compound by using a rubber "spreader".

After the filming or coating operations described, heat is utilized to effect the blowing of the rubber compound and simultaneously to vulcanize the rubber.

While it is not desired to restrict the invention to any particular form or method of vulcanizing and blowing, since various ways are known in the art, it is preferred for one character of leather substitute, that these operations be effected by passing the fabric under and over a series of rolls placed in the top and bottom of a hot air box. The temperature of the box and the time of curing are dependent to some extent, upon the curing conditions required of the compound, as known in the art. It is desirable to use ultra-accelerators active at temperatures of 200° F. to 250° F. as this range of temperatures produce very finely divided blows and yields rubber layer films filled with myriads of very small gas voids, such as it is attempted to illustrate at 6.

The product may be given a flatter and smoother surface by subjecting the fabric to tension and pressure during vulcanization either just prior to the set of the rubber or during the entire vulcanizing and blowing operation. This smoothing pressure ordinarily should be of limited magnitude and care should be exercised to prevent breaking down or destroying the myriad small rubber filmed, fiber reinforced gas voids or cells.

The material may be dusted with starch, talc, soapstone or other dusting agents, or it may receive a finishing coat or coats, such as rubber cement, shellac, varnish or other suitable finishes, such as indicated at 7, and which may be embossed, printed upon, or otherwise treated.

The product of the invention is characterized by a central fibrous or fabric base strengthened and consolidated with an adhesive agent and pressure, as contrasted to prior materials having an originally relatively strong textile base but which has been weakened by napping to secure certain plumpness in the product. Furthermore, the product has a distinguishably soft, plump leather-like feel, together with a cushiony, yielding, elastic wearing surface. These improved characteristics and results moreover are obtained at relatively low cost and with simplicity of manufacturing steps. In the blowing operation, the short length fibers, which may lay more or less flat with the filmed compound, as applied to the base, will be disturbed and placed at different angles, many of them brought to upstanding positions at right angles to the general plane of the sheet. This change in positions is illustrated in the drawing, Fig. 1, indicating the fibers lying down with the film and Fig. 2 showing them brought into upstanding and different angular positions by the blowing of the composition. Instead of using vulcanizable rubber compound heretofore mentioned as the adhesive, solutions of vulcanized compounded latex may be used and blown according to known methods.

As the invention is susceptible to various modifications, it should be understood that the terms employed herein have been used in a descriptive rather than in a limiting sense, except possibly for limitations that may be imposed by state of the prior art.

What is claimed is:

1. The herein disclosed process of manufacturing material for use as a leather substitute and the like, comprising saturating a fibrous sheet with a rubber compound solution, drying, calendering, coating on one or both sides with a rubber compound containing a blowing agent and short length fibers, heating to blow said compound and form numerous fine gas spaces, vulcanizing and coating with a surface layer or layers.

2. The herein disclosed process of manufacturing a material suitable for use as a leather substitute and the like, comprising saturating a woven fabric base with vulcanized rubber compound, sheeting a film of rubber compound containing a blowing agent and short length fibers onto said rubber compound saturated fabric base, blowing said second loaded compound to fill the same with numerous fine gas cells and to bring the reinforcing fibers into upstanding relation on the base interrupting and reinforcing the created gas cells, and vulcanizing the cellular reinforced structure.

ALBERT J. HANLEY.
ROLAND B. RESPESS.